May 2, 1961 W. E. BENNETT 2,982,140
GYROSCOPE ASSEMBLY
Filed Feb. 6, 1959 3 Sheets-Sheet 1

INVENTOR:
William E. Bennett

By Smyth & Roston
Attorneys

INVENTOR:
William E. Bennett

May 2, 1961 W. E. BENNETT 2,982,140
GYROSCOPE ASSEMBLY
Filed Feb. 6, 1959 3 Sheets-Sheet 3
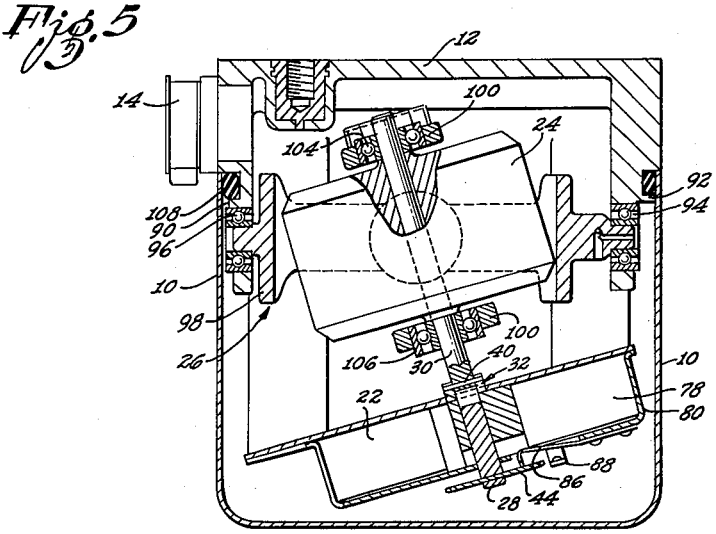
Fig. 5
Fig. 6
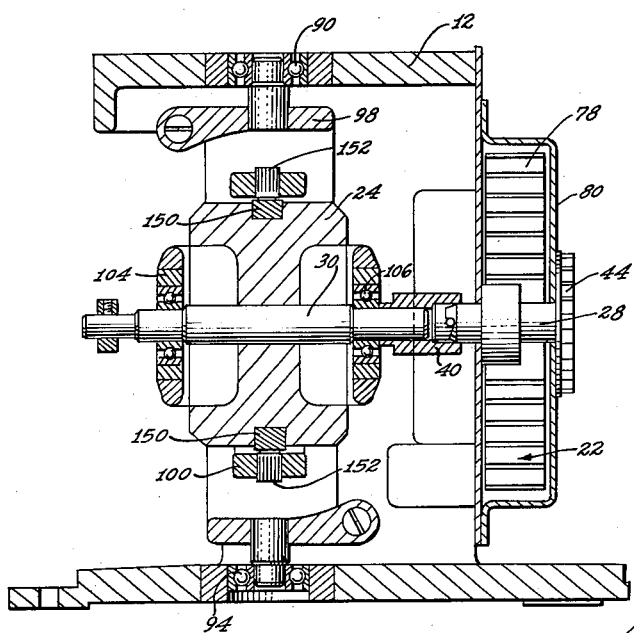
Fig. 7
INVENTOR:
William E. Bennett
Attorneys

# United States Patent Office 2,982,140
Patented May 2, 1961

2,982,140

GYROSCOPE ASSEMBLY

William E. Bennett, Encino, Calif., assignor to Telecomputing Corporation, a corporation of California Filed Feb. 6, 1959, Ser. No. 791,619

3 Claims. (Cl. 74—5.12)

The present invention relates to gyroscopes of the rotating inertial mass type, and it relates more particularly to an improved spring-energized gyroscope which is especially suited in one of its embodiments for the control of vehicles such as short-range missiles, drone targets and the like.

The invention is more generally concerned with a gyroscope assembly which includes means for mechanically accelerating a gyro rotor up to its operating speed, and for then automatically disengaging the accelerating mechanism from the rotor. The gyro rotor may be supported on a usual gimbal structure, and the disengagement of the accelerating mechanism from the rotor after the latter has attained its operating speed enables the rotor to be then freely supported on the gimbal structure.

The gyroscope of the present invention finds utility in short-range missiles, as noted above, in which the rotor is rapidly accelerated to operational speed and is then permitted to rotate freely for the duration of the flight of the missile. However, electrically-energized drive motors for the rotor can be incorporated in the gyro assembly (as will be described) for use, for example, in medium-range and long-range missiles.

In accordance with the concept of the invention, the rotor of the gyroscope is quickly accelerated up to speed by the mechanical drive mechanism referred to above, and the only function of the electric motor mentioned in the preceding paragraph is to maintain the rotor at its operational speed. A relatively small motor can therefore be used, as compared with the prior art electrically-driven gyros, because the electric motor utilized in a gyro constructed in accordance with the teachings of the present invention merely performs a sustaining function and is not called upon to exert high acceleration forces on the rotor.

A feature of the improved gyroscope assembly of the present invention resides in the provision of the drive mechanism which provides for the rapid mechanical acceleration of the intertial mass up to its operational speed. This rapid acceleration of the rotor is achieved in the assembly of the invention by means of a minimum of components and with a high degree of simplicity in the overall assembly.

As noted in the preceding paragraph, the improved assembly of the invention includes means for accelerating the gyro mass to operating speed. The drive member is then automatically disengaged to provide freedom to the gyro gimbal system. This operation, as noted above, is accomplished with a minimum of parts and complexity.

A spring drive mechanism is utilized as the acceleration producing means in the embodiments of the invention to be described. In accordance with the teaching of the invention, this mechanism is mounted on the frame of the gyroscope rather than on the rotor itself. A spindle extends from the spring drive mechanism into engagement with the shaft of the rotor. This provides a means for providing the gimbal system with a fixed orientation with respect to the frame of the instrument initially to cage the gyro rotor, as well as providing a means for transmitting accelerating torques from the spring drive mechanism to the rotor.

The gimbal system itself in the gyroscope of the present invention is independent of any rotor acceleration torque. This is because the spring energy from the drive mechanism is released through its spindle to the shaft of the gyro rotor as a pure torque couple operating about the center of gravity of the inertial mass which is being accelerated. Therefore, the same shaft member is used to orient as well as to transmit the accelerating torques. Because of this, no opposing forces are present and the limit of torque that can be transmitted to the rotor depends only on the stress limitation of the connecting coupling.

Another feature of the improved gyroscope of the invention resides therefore in the provision of an instrument in which an acceleration producing spring drive mechanism is mounted on the gyro frame and is capable of providing initial caging of the gyro rotor. Then, upon the triggering of the drive mechanism, the rotor is rapidly brought up to speed without any acceleration forces being translated to the gimbal system. When the rotor achieves its operational speed, its drive shaft is automatically released from the spindle of the spring drive mechanism, and the spinning rotor is then freely supported on the gimbal system.

The gyroscope of the present invention is advantageous from a cost standpoint and from the aspect of constructional simplicity. The spring drive mechanism may include a relatively powerful helical spring. The drive mechanism moreover, as mentioned above, initially cages the gyro rotor. The gyro may be uncaged and energized instantaneously at the time of firing of the vehicle in which the gyro is mounted, or at any other desired time. The gyro may then provide accurate stabilization of the vehicle while the rotor is spinning in a free running state up to periods of the order of ten minutes. For the motor-driven rotor, as mentioned above, the operational period is, of course, indefinitely extended. In a constructed embodiment of the invention, total drift of less than 3 degrees during a two-minute missile flight has been demonstrated.

The spring drive mechanism of the embodiment of the invention to be described is advantageous in that it permits the gyroscope to be caged and armed at the factory, and then inserted in a dust sealed or hermetically sealed housing for facilitating its subsequent handling and installation in the vehicle in which the gyroscope is to be mounted.

The gyroscope of the invention, as will be described, is manually caged and armed; and it is then locked until its release mechanism is activated. The release mechanism of the embodiment to be described is extremely simple, and it may be activated electrically at the firing time of the vehicle in which the gyro is installed.

The spring-energized gyroscope of the invention is extremely rugged and reliable. Outstanding reliability has been demonstrated by constructed embodiments of the invention under severe conditions of temperature, shock and vibration. Moreover, the constructional simplicity of the instrument of the invention renders it susceptible for large scale production at low unit cost.

Cumbersome and expensive electrical systems for caging and energizing the gyroscope have been dispensed with. Because the instrument is uncaged at firing time, extensive warm-up and testing periods are also eliminated.

The features of the invention which are believed to be new are set forth in the claims at the end of the present specification. The invention itself, however, may best be understood by reference to the accompanying drawings in which:

Figure 5 is a side elevational view of the gyroscope assembly, partly in section, on a reduced scale with respect to Figures 4a and 4b, this latter view illustrating the manner in which the spring drive motor is releasably coupled to the gimballed gyro mass, and how the coupling initially holds the mass in a caged condition;

Figure 6 is a fragmentary view of the releasable coupling between the spindle of the spring drive motor and the drive shaft of the gimballed gyro mass; and Figure 7 is a side sectional view of a modification incorporating an electric motor for sustaining rotation of the gyro mass after the mass has been brought up to a predetermined speed by the spring drive motor.

Figure 1:
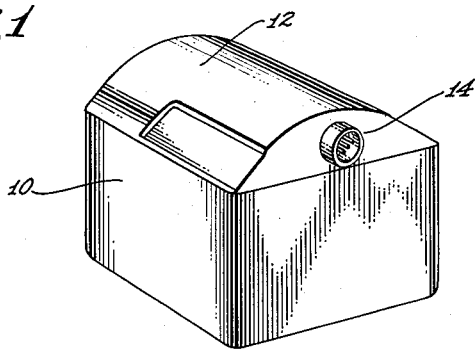
Figure 1 is a perspective view of one embodiment of the invention enclosed in an appropriate hermetically sealed housing.
Figure 2:
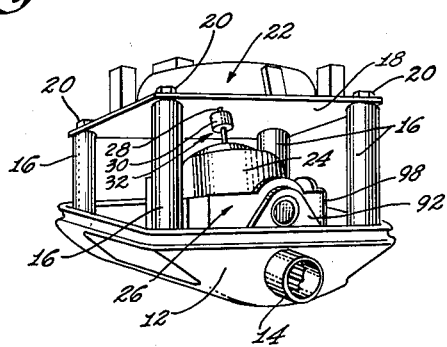
Figure 2 is a side elevational view of the unit of Figure 1 with the cover removed to reveal a gimbal supported gyro mass coupled through a releasable coupling to a spring-type drive motor, the inertial mass being held in a caged condition by the coupling.
Figure 3:
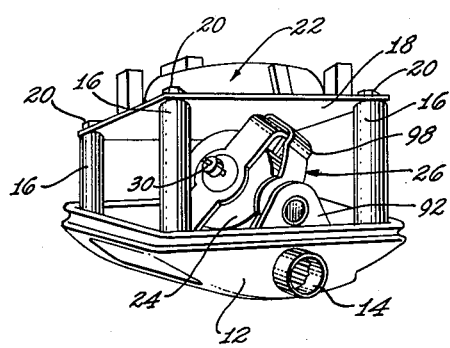
Figure 3 is a side elevational view, similar to the view of Figure 2 but illustrating the gyro mass after decoupling from the spring drive motor and after its speed has run down.

The particular embodiment of the invention illustrated in Figures 1–3 includes a housing which, as mentioned above, may be hermetically sealed. The housing has a cover portion 10, and it also has a base portion 12. The base portion supports the various components of the gyroscope assembly, and it also has an electric socket 14 mounted on it. All the electrical circuits incorporated in the gyroscope assembly are connected through the socket 14.

As best shown in Figures 2 and 3, the base portion 12 has a rectangular configuration, and it supports four posts 16 which extend upwardly from its four corners. A mounting plate 18 is supported by the posts 16, and the mounting plate is secured to the posts by a plurality of screws 20. The mounting plate 18 is supported in spaced parallel relationship with the plane of the base portion 12. A spring motor 22 is supported on the top side of the mounting plate 18. An inertial mass 24 is rotatably mounted in a gimbal structure 26, the gimbal structure being supported by the base portion 12, and the inertial mass being rotatably supported in the gimbal structure between the mounting plate 18 and the base portion 12.

The drive motor 22 is mounted in coaxial relationship with the axis of rotation of the inertial mass 24 when the mass is driven by the spring motor 22, as will be explained. The drive motor 22 has a spindle 28 which extends from it along the initial axis of rotation of the inertial mass 24, and the mass 24 has a drive shaft 30 which extends in axial relationship with the spindle 28 during the initial conditions of the gyroscope assembly.

A coupling 32 releasably couples the spindle 28 to the drive shaft 30. As shown in Figure 6, the spindle 28 has a collar 34 formed at its end, and a helical slot 36 is formed in the collar. The end of the drive shaft 30 extends into the collar 36, and that end of the drive shaft has a radial pin 40 extending through it to engage the helical slot 36.

The elements 34, 36 and 40 form the releasable coupler 32. So long as the rotational speed of the spindle 28 from the spring motor 22 exceeds the speed of the shaft 30 of the inertial mass 24, the pin 40 remains in the slot 36 so that a drive torque is transmitted from the spindle 28 to the shaft 30. However, when the drive motor runs down and its speed drops below the speed of the inertial mass, the drive shaft 30 causes its pin 40 to move out of the helical slot. As the pin moves out of the slot, it moves the two shafts 30 and 28 axially apart. The shaft 28 is axially movable along the axis of rotation, so that such disengagement causes that shaft to move back into the spring motor 22. A suitable spring loaded ratchet 42 (Figures 4a and 4b) then moves into position under a ratchet wheel 44 at the other end of the spindle 28 to hold the spindle back in a released condition with respect to the drive shaft 30.

The spring motor 22 initially holds the inertial mass 24 about a predetermined axis of rotation within its gimbal structure 26. The inertial mass 24 is therefore initially caged and held in a checked position with respect to the frame until release. The spring motor 22 may be in a wound condition, when the assembly is in the condition illustrated in Figure 2. Then, the release of the spring motor 22 causes it to impart an accelerating torque to the inertial mass 24 causing the mass to rotate about the initial axis of rotation. This accelerating torque is transmitted to the inertial mass through the spindle 28 and through the releasable coupler 32 to the drive shaft 30 of the inertial mass.

When the speed of rotation of the inertial mass about the initial axis of rotation reaches a speed at which it exceeds the rotational speed of the drive motor 22, the releasable coupling 32 causes the spindle 28 to become disengaged from the drive shaft 30. It also moves the spindle 28 axially back into the drive motor 22, as mentioned above, and the ratchet 42 moves under the displaced ratchet wheel 44 to hold the spindle 28 back in its disengaged position. The inertial mass is now free to rotate in its gimbal structure, and it continues its free running for a period of, for example, 12 minutes. In a manner to be described, a suitable sustaining motor may be incorporated to maintain the gyro mass at the predetermined speed indefinitely.

When the inertial mass finally runs down, assuming that no sustaining motor is included, or that the sustaining motor is finally de-energized, the inertial mass rocks in its gyro structure to a position such as the position shown in Figure 3.

Figure 4A:
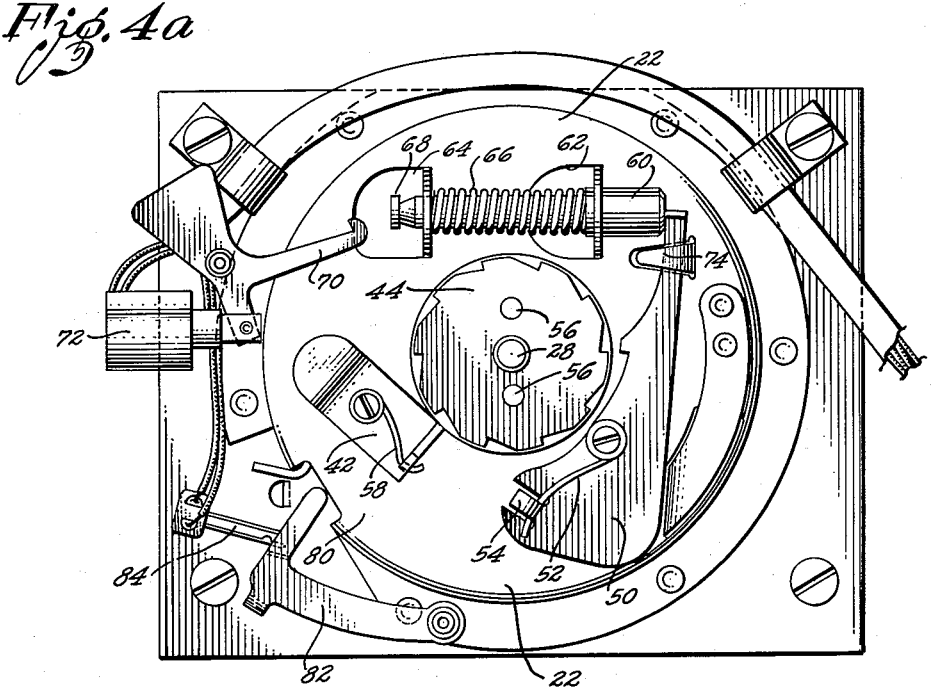
Figure 4a is a top plan view of the apparatus of one embodiment of the invention on an enlarged scale with respect to Figure 3 and taken substantially on the line 4—4 of Figure 3, this view illustrating the various operating components associated with the spring drive motor of the illustrated gyroscope assembly.
Figure 4B:
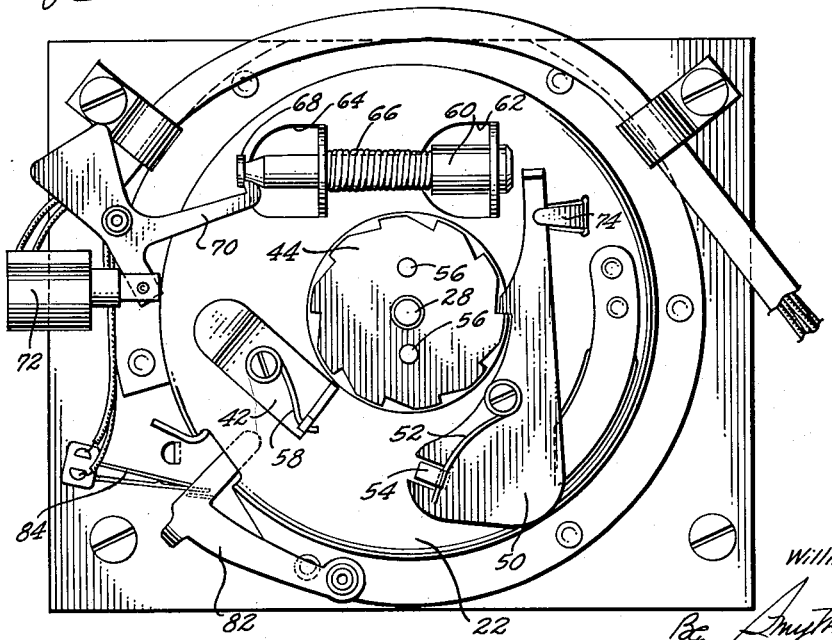
Figure 4b is a view similar to the view of Figure 4a, the view of Figure 4b showing the spring drive motor in a cocked condition, whereas the view of Figure 4a shows the drive motor in a released condition.

The details of the cocking mechanism for the spring motor 22 are shown in Figures 4a and 4b. The mechanism includes a pawl 50 which is pivotally mounted on the spring motor, and which is positioned to engage the ratchet wheel 44. A spring 52 extends around the pivot axis of the pawl 50 and into engagement with a lug 54 on the pawl to normally bias the pawl into engagement with the ratchet wheel 44. A pair of detents 56 are formed in the ratchet wheel 44 on diametrically opposite positions with respect to the spindle 28. These detents receive an appropriate key, so that the spring motor may be manually wound.

The spring motor includes a helical spring which is keyed to the spindle 28, as is the ratchet wheel 44. Therefore, rotation of the ratchet wheel winds the spring motor to an armed condition, and the spring motor is maintained in such a condition by the pawl 50. It will be appreciated that prior to winding the spring motor, the spring loaded ratchet 42 is withdrawn from the ratchet wheel 44, and the ratchet wheel and spindle 28 are moved down through the spring motor 22 into engagement with the shaft 30 of the inertial mass 24, as shown in Figure 2.

The ratchet 42 is spring loaded, for example, by a spring 58, and it is normally biased against the lower portion of the ratchet wheel 44. Upon release of the coupling 32, the ratchet wheel moves back and the ratchet 42 moves in under the ratchet wheel from the position of Figure 4b to the position of Figure 4a to hold the spindle 28 disengaged from the shaft 30.

An impacting member 60 is supported between a pair of brackets 62 and 64 which are mounted on the spring motor 22. The impactor 60 is supported on the brackets for rectilinear motion from a first position spaced from the pawl 50 to a second position in which it is driven against the pawl to release the pawl from the ratchet wheel 44. A spring 66 is coiled about the impactor 60 between the brackets 62 and 64. The impactor 60 may be moved back against the force of the spring 66 to the position shown in Figure 4b.

The impactor 60 includes a head portion 68 which exhibits a peripheral shoulder to a cocking pin 70. When the cocking pin 70 engages the peripheral shoulder of the head 68, the impactor 60 is held back in the position shown in Figure 4b in spaced relationship with the pawl 50. When the mechanism is in this particular condition, the pawl 50 engages the ratchet wheel 44, as shown in Figure 4b, to hold the spring motor in an armed condition. A suitable electric fuse means, which may be in the form of an electrically actuated solenoid 72, is coupled to the cocking pin 70. In the illustrated embodiment, the cocking pin 70 is pivotally mounted on the spring motor 22, and it is normally held in engagement with the head 68 of the impactor 60 by the solenoid 72.

Should the solenoid 72 be energized, its armature is retracted to release the cocking pin 70 from the head 68 of the impactor 60. This causes the impactor to be driven against the pawl 60. When the impactor impacts with the pawl 50, it drives the pawl out of engagement with the ratchet wheel 44 and back against a bracket 74, to the position shown in Figure 4a. This releases the spring motor and enables it to impart an accelerating torque to the inertial gyro mass 24. It will be appreciated that other types of fuse means can be used to release the impactor 60.

As noted above, the spring motor 22 includes a helical spring 78 which is mounted within a housing 80 (Figure 5) in coaxial relationship with the initial axis of rotation of the inertial mass 24. As the spring motor is wound into an armed condition, its convolutions move inwardly into a tightly coiled condition about the initial axis of rotation. A spring loaded arm 82 (Figures 4a and 4b) is mounted on the spring motor, and it includes an extremity which extends into the housing 80 of the spring motor and against the outer convolutions of the helical spring. Then, as the spring motor is wound, the actuating arm 82 moves in a clockwise direction in Figures 4a and 4b from an outer position as shown in Figure 4a to an inner position as shown in Figure 4b, as the spring motor is wound from an unwound condition to a completely wound condition.

A pair of switch contacts 84 are provided, and these contacts are designed to be closed by the actuator 82 when the spring motor is wound to a predetermined tightness. A suitable indicator is electrically actuated by the contacts 84 to provide an indication when the spring motor is wound to a desired tightness.

As shown in Figure 5, a resilient switch armature 86 is mounted on the spring motor 22, and this armature is held spaced from a fixed contact 88 when the ratchet wheel 44 is moved down into position in which the spindle 28 is coupled with the shaft 30. However, upon the subsequent release of the shaft 30 from the spindle 28, the ratchet wheel 44 moves out from the spring motor 22, as described above, and when that occurs, the switch armature 86 engages the fixed contact 88. This engagement enables a suitable electrically actuated indication to be made when the gyro mass becomes uncaged and free from the spring driving mechanism.

The details of the gimbal structure 26 are shown more clearly in Figure 5. As illustrated in Figure 5, the base portion 12 of the gyro housing supports a pair of bosses 90 and 92 which are axially spaced from one another and which support respective bearings 94 and 96. An outer gimbal member 98 is rotatably mounted by the bearings 94 and 96 in the bosses 90 and 92.

The outer gimbal member 98 rotatably supports an inner gimbal member 100 in a pair of bearings, such as the bearing 102. The inertial mass 24 is mounted on its drive shaft 30 in a pair of bearings 104 and 106 which, in turn, are supported by the inner gimbal member 100. This construction permits a gimballed support of the inertial mass 24 on the base portion 12, and it also permits free rotational motion of the inertial mass about its central axis.

An O-ring 108 is provided for receiving the cover portion 10 and for assisting in maintaining an hermetic seal between the cover portion and the base portion of the housing.

A constructed embodiment of the invention exhibited the following operational characteristics, and these characteristics are listed herein merely by way of example, and they are not intended to limit the invention in any manner.

Motor type: Wound spring energized.
Starting time: 0.1 to 0.5 second depending on operational time required.
Coast time: Effective gyro from 3 to over 10 minutes as required.
Drift rate: As low as 0.625 degree per minute with potentiometer on outer gimbal only. As low as 0.75 degree per minute potentiometer pickoff on both inner and outer gimbal if averaged over a 10 minute period.
Resolution: 0.25%.
Angular range: ±65°.
Active angular range: 45°.
Temperature range: —65° F. to +165° F.
Shock: 30 G's for 6 milliseconds.
Vibration: 20 c.p.s. to 2000 c.p.s. at 10 G's.
Linear acceleration: 3 G's in either direction along 3 mutually perpendicular axes.

The gyroscope assembly of Figure 7 is generally similar to the structure shown in the other figures and described above. However, the latter embodiment includes an electric motor which is used for sustaining the rotational motion of the inertial mass 24 after the mass has been brought up to a predetermined rotational speed by the spring motor 22. As pointed out previously, the fact that the sustaining motor is not called upon to provide the initial acceleration torques for the inertial mass enables the motor to be relatively small in size as compared with the size which otherwise would be required.

The electric motor may, for example, be a split-hysteresis alternating current motor, or it may be a direct current pulse type motor. The moment of inertia of the inertial mass 24 may, for example, be approximately 1000 gm. cm.$^2$ and it may have a rotational speed of approximately 10,000 r.p.m. For such a moment of inertia and rotational speed, approximately 6–8 gm. cm. torque is required to sustain the speed of the inertial mass.

When an alternating current split synchronous hysteresis motor is used, for example, the hysteresis material may be attached to the outer diameter of the inertial mass 24, as indicated at 150 in Figure 7. The stator and its windings may be in two sections, as indicated at 152, with the sections being attached to the inner gimbal member 100 in a symmetrical relationship. The electric motor may be energized at the instant the gyro receives the uncaging signal, but it will be utilized only after the rotor has been accelerated up to the predetermined speed by the spring motor.

When a direct current self-activating pulse type of motor is used, a series of permanent magnets may be imbedded in the periphery of the inertial mass 24, with alternate poles following one another around the periphery of the mass. An electro-magnet may then be attached to the inner gimbal and placed near the mass, with its poles lined up with the poles of the permanent magnets. The electro-magnet may be activated by the angular position of the inertial mass, so that a thrust is applied 50% of the time (for example) in the proper direction. The angular location of the inertial mass may be sensed for example, by an inductive pickup whereupon a transistor switch may be closed to energize the electro-magnet and supply motor torque. Conversely a more conventional approach would be to use a commutator on the drive shaft 30 of the inertial mass to activate the electro-magnet.

The following specifications may be used in the embodiment of Figure 7:

| | |
|---|---|
| Motor start time (spring energized) | .1 second. |
| Inertia of inertial mass | 1,000 gm. cm². |
| Motor power | 3–6 watts (115 v., 400 c.p.s., 3 phase—or 28 v. D.C.). |
| Constant motor speed | 10,000 r.p.m. |
| Sustaining torque | 6–8 gm. cm. |

The invention provides, therefore, an improved gyroscope in which the rotor or inertial mass may initially be held in a caged position with respect to the frame of the instrument. A spring motor is mounted on the frame to impart an initial accelerating torque to the rotor of the gyro. This torque is transmitted to the gyro rotor through a pure torque couple operating about the center of gravity of the rotor so that no opposing forces are present.

The improved structure of the invention, permits the rotor initially to be caged, and then permits it to be quickly accelerated up to speed and released for complete gimballed freedom.

As described above, the rotor of the gyroscope may be free running, or a relatively small sustaining motor may be incorporated to maintain the rotor at a predetermined operational speed.

I claim:

1. A gyroscope assembly including: a frame member, gimbal means mounted on the frame member, an inertial mass member rotatably mounted in the gimbal means, a drive shaft mechanically coupled to the inertial mass and extending along the axis of rotation thereof, a helical-spring drive motor mounted on the frame in coaxial relationship with the axis of rotation of the inertial mass for imparting an accelerating torque to the inertial mass, a spindle mechanically coupled to the drive motor and capable of extending through the drive motor in axial relationship with the drive shaft of the inertial mass, said spindle being axially movable with respect to the drive shaft, a coupler for releasably coupling the spindle of the drive motor to the drive shaft of the inertial mass as long as the spindle of the drive motor rotates at the same speed as the drive shaft of the inertial mass, a ratchet wheel mounted on the end of the spindle remote from the drive shaft, a pawl positioned against the ratchet wheel for releasably engaging the ratchet wheel, an actuator for tripping the engagement of the pawl with the ratchet wheel, and a spring-loaded ratchet for engaging the ratchet wheel to hold the spindle axially spaced from the drive shaft upon the release thereof by said coupler.

2. A gyroscope assembly including: a frame member, an inertial mass member rotatably mounted on the frame member and including a drive shaft extending along the axis of rotation thereof, a spring-wound drive motor mounted on the frame and including a spindle extending outwardly therefrom, a ratchet wheel mechanically coupled to the drive motor, a spring loaded pawl positioned adjacent the ratchet wheel to engage the same and maintain the motor in a wound condition, an actuator positioned adjacent the pawl and controllable to disengage the pawl from the ratchet wheel, and means for releasably coupling the spindle to the inertial mass to hold the inertial mass initially in a caged condition and to transmit an accelerating force to the inertial mass upon the disengagement of the pawl from the ratchet wheel by the actuator, said actuator including a movable impacting member, cocking means for holding the impacting member in spaced relationship with the pawl, spring means for driving the impacting member against the pawl upon the release of the cocking means, and electrically controlled means for controlling the release of the cocking means.

3. A gyroscope assemby including: a frame member, an inertial mass member rotatably mounted on the frame member and including a drive shaft extending along the axis of rotation thereof, a spring-wound drive motor mounted on the frame and including a spindle extending outwardly therefrom, a ratchet wheel mechanically coupled to the drive motor, a spring loaded pawl positioned adjacent the ratchet wheel to engage the same and maintain the motor in a wound condition, an impacting member positioned adjacent the pawl and controllable to impact the pawl to disengage the pawl from the ratchet wheel, and means for coupling the spindle to the inertial mass to hold the inerital mass initially in a caged condition and to transmit an accelerating force to the inertial mass upon the disengagement of the pawl from the ratchet wheel by the impact member.

References Cited in the file of this patent

UNITED STATES PATENTS

| | | |
|---|---|---|
| 562,235 | Obry | June 16, 1896 |
| 814,969 | Leavitt | Mar. 13, 1906 |
| 1,322,069 | Spiro | Nov. 18, 1919 |
| 1,791,755 | Dieter | Feb. 10, 1931 |
| 2,732,721 | Summers | Jan. 31, 1956 |

FOREIGN PATENTS

| | | |
|---|---|---|
| 581,737 | Great Britain | Oct. 23, 1946 |
| 211,412 | Australia | Nov. 12, 1957 |